(12) United States Patent
Chuang

(10) Patent No.: US 6,322,139 B1
(45) Date of Patent: Nov. 27, 2001

(54) BICYCLE SADDLE WITH VENTILATION FUNCTION

(76) Inventor: Louis Chuang, P.O. Box 63-247, Taichung (TW)

( * ) Notice: Subject to any disclaimer, the term of this patent is extended or adjusted under 35 U.S.C. 154(b) by 0 days.

(21) Appl. No.: 09/611,820

(22) Filed: Jul. 7, 2000

(30) Foreign Application Priority Data

Apr. 7, 2000 (TW) .............................................. 089205660

(51) Int. Cl.[7] ..................................................... B60N 2/38
(52) U.S. Cl. .................. 297/195.1; 297/202; 297/452.42
(58) Field of Search ............................... 297/195.1, 199, 297/200, 202, 180.1, 180.11, 180.13, 180.14, 180.16, 284.6, 284.1, 452.15, 452.42, 452.43, 452.44, 452.47; 5/724, 726

(56) References Cited

U.S. PATENT DOCUMENTS

| | | | |
|---|---|---|---|
| 583,209 | * | 5/1897 | Cleland .................................. 297/199 |
| 594,451 | * | 11/1897 | Wheeler ................................ 297/202 |
| 605,673 | * | 6/1898 | Hunt ..................................... 297/202 |
| 654,720 | * | 7/1900 | Englebert .............................. 297/202 |
| 3,209,380 | * | 10/1965 | Watsky ........................... 297/452.47 X |
| 5,025,519 | * | 6/1991 | Spann et al. ........................... 5/724 X |
| 5,356,205 | * | 10/1994 | Calvert et al. ................ 297/180.14 X |
| 5,597,200 | * | 1/1997 | Gregory et al. .................. 297/180.13 |
| 6,039,395 | | 3/2000 | Culbertson . |
| 6,059,359 | * | 5/2000 | Cassani ............................. 297/195.1 |

* cited by examiner

Primary Examiner—Peter M. Cuomo
Assistant Examiner—Stephen Vu
(74) Attorney, Agent, or Firm—Alan Kamrath; Rider, Bennett, Egan & Arundel, LLP

(57) ABSTRACT

A bicycle saddle includes a recessed portion in an upper side thereof, the recessed portion including a bottom having at least one opening. At least one guide plate is mounted in the bicycle saddle and includes an inlet that faces a front of the bicycle saddle. The guide plate and the bottom of the recessed portion of the bicycle saddle together defining a channel that communicates the inlet with the opening of the recessed portion of the bicycle saddle. A side vent is defined in each lateral side of the bicycle saddle. Thus, ambient air enters the recessed portion via the opening in the recessed portion and the side vents of the bicycle saddle during cycling to thereby provide a ventilation effect.

6 Claims, 4 Drawing Sheets

BICYCLE SADDLE WITH VENTILATION FUNCTION

BACKGROUND OF THE INVENTION

1. Field of the Invention

The present invention relates to a bicycle saddle with ventilation function for dissipating heat generated in the genital area as a result of friction at the buttocks and inner thighs of the cyclist during cycling.

2. Description of the Related Art

Numerous bicycle saddles or seats have been proposed to provide comfortable support for the cyclist. U.S. Pat. No. 6.039,395 issued to Culbertson on Mar. 21, 2000 discloses a bicycle saddle for supporting the cyclist in a comfortable position for extended periods without interfering with pedaling. Although the supporting problem for the cyclist has been successfully solved, the cyclist still suffers from high heat that is generated at the buttocks and inner thighs of the cyclist due to repeated frictional movements at the buttocks and the inner thighs of the cyclist. The cyclist sweats and thus feels uncomfortable and sometimes has rashes. The high heat can also cause infertility in male cyclists and can lead to health problems.

SUMMARY OF THE INVENTION

It is the primary object of the present invention to provide an improved bicycle saddle with ventilation function for dissipating heat generated in the genital area as a result of friction at the buttocks and inner thighs of the cyclist during cycling.

A bicycle saddle in accordance with the present invention comprises a recessed portion in an upper side thereof, the recessed portion including a bottom having at least one opening. At least one guide plate is mounted in the bicycle saddle and includes an inlet that faces a front of the bicycle saddle. The guide plate and the bottom of the recessed portion of the bicycle saddle together defining a channel that communicates the inlet with the opening of the recessed portion of the bicycle saddle. A side vent is defined in each lateral side of the bicycle saddle. Thus, ambient air enters the recessed portion via the opening in the recessed portion and the side vents of the bicycle saddle during cycling to thereby provide a ventilation effect.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
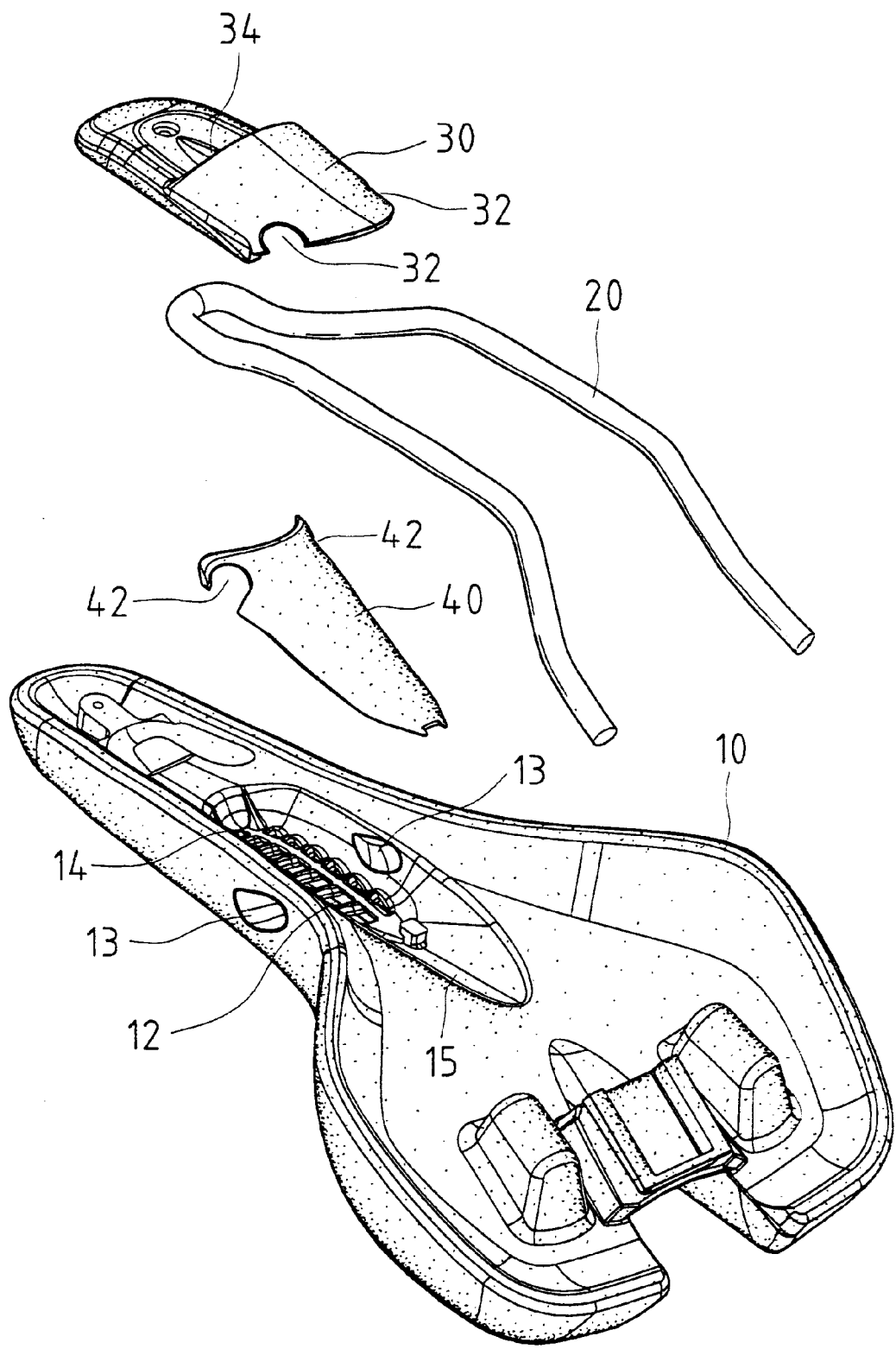
FIG. 1 is a bottom exploded perspective view of a bicycle saddle in accordance with the present invention.
Figure 2:
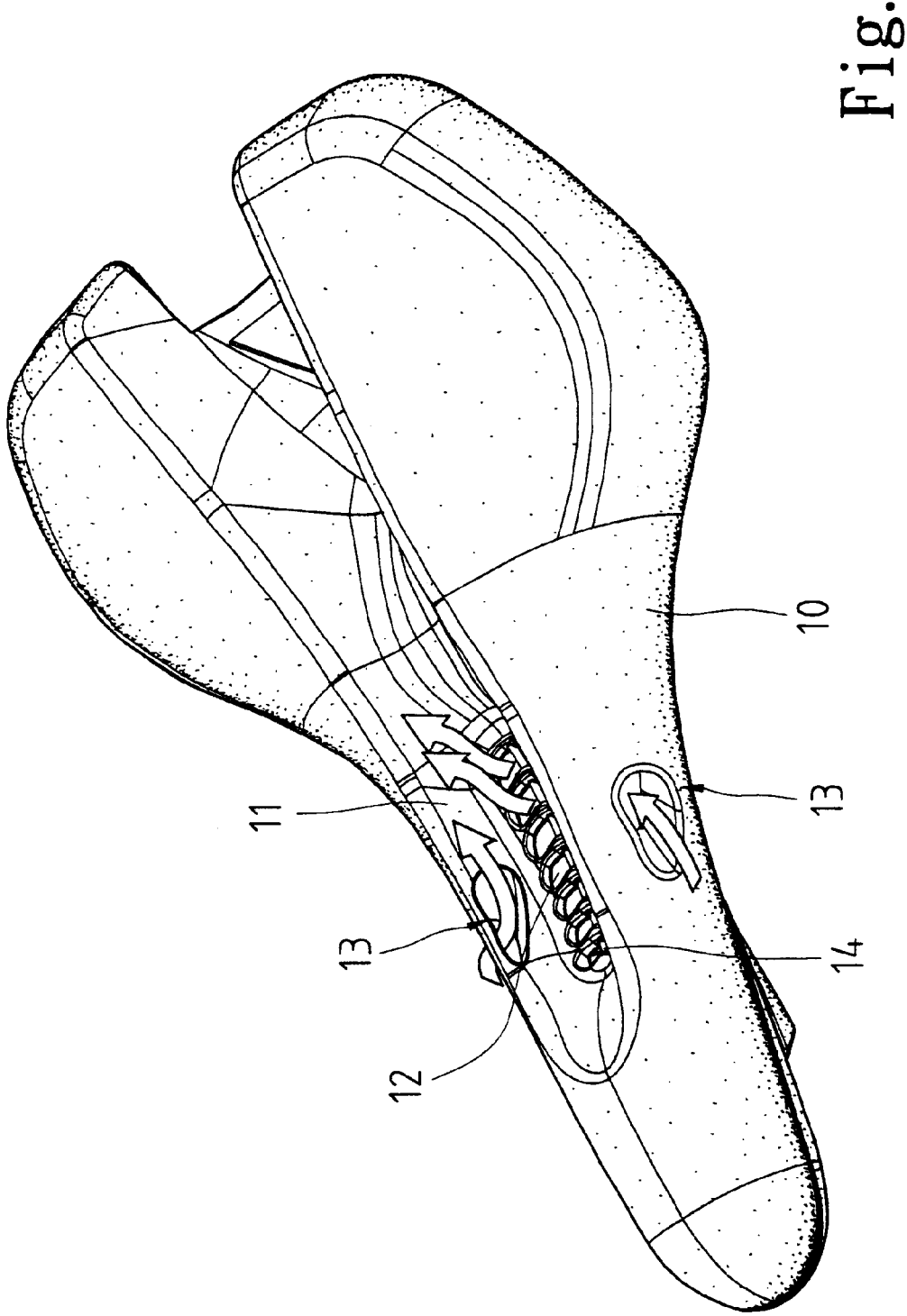
FIG. 2 is a perspective view of the bicycle saddle in accordance with the present invention.

Referring to FIGS. 1 and 2, a bicycle saddle 10 in accordance with the present invention generally includes a recessed portion 11 in an upper side thereof. The recessed portion 11 includes a bottom 14 with a plurality of openings 12 for communicating the recessed portion 11 with an interior 15 of the bicycle saddle 10.

A first guide plate 30 and a second guide plate 40 are mounted in the bicycle saddle 10 by a substantially U-shape mounting rod 20. In this embodiment, the first guide plate 30 includes a notch 32 in each lateral side thereof through which the mounting rod 20 extends. The second guide plate 40 also includes a notch 42 in each lateral side thereof through which the mounting rod 20 extends. The first guide plate 30 includes an inlet 34 that faces a front of the bicycle saddle 10. In addition, the first guide plate 30 and the second guide plate 40 are overlapped to define a channel 36 (FIG. 4) that communicates the inlet 34 with the openings 12 of the recessed portion 11 of the bicycle saddle 10.

Figure 3:
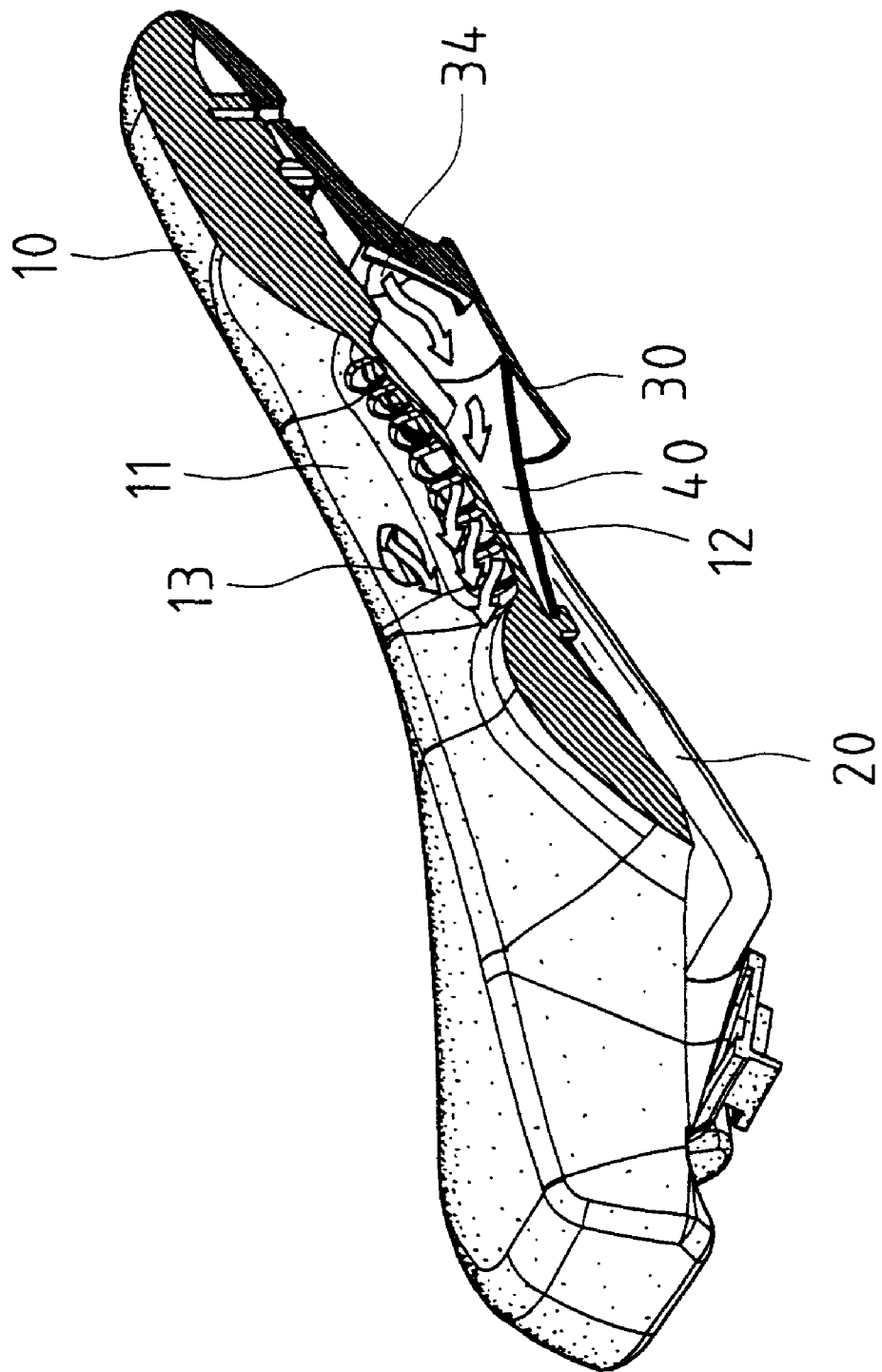
FIG. 3 is a perspective view, partly sectioned, of the bicycle saddle in accordance with the present invention.
Figure 4:
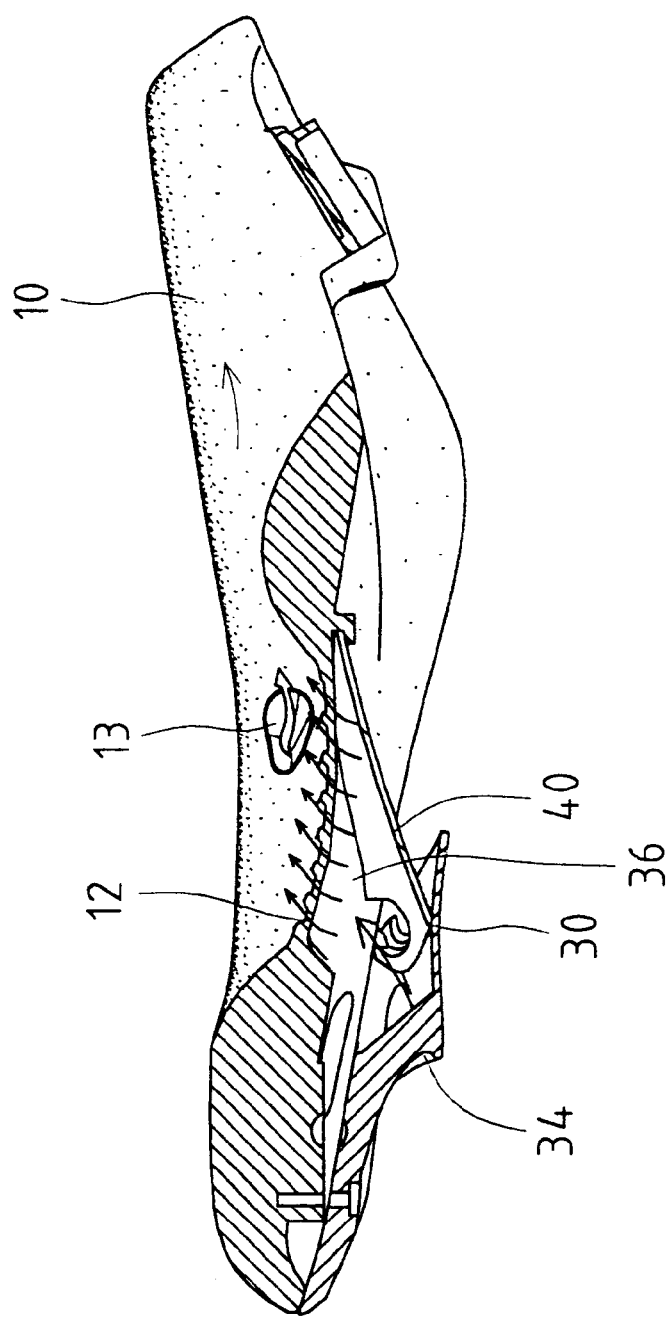
FIG. 4 is a schematic partly sectioned left side view of the bicycle saddle, illustrating the ventilation function.

In use, the genitals (including the penis and the testes) of a male cyclist is received in the recessed portion 11 of the bicycle saddle 10 to avoid injury and friction. In addition, as shown in FIGS. 3 and 4, air in front of the bicycle saddle 10 is guided into the channel 36 via the inlet 34 of the first guide plate 30 and then enters the recessed portion 11 via the openings 12. Air that enters the recessed portion 11 circulates to provide a heat-dissipating effect for dissipating heat generated in the genital area as a result of friction at the buttocks and inner thighs of the cyclist (either male or female) during cycling. Thus, heat generated in the genital area as a result of friction at the buttocks and inner thighs of the cyclist during cycling is dissipated effectively. It is noted that the speed of the air increases when the cycling speed increases, the heat-dissipating effect of the air circulating in the recessed portion 11 of the bicycle saddle 10 is sufficient to bring away larger heat as a result of faster cycling. Further, side vents 13 are provided on lateral sides of the bicycle saddle 10, respectively. Each side vent 13 communicates the recessed portion 11 with ambience. The side vents 13 allow ambient air to enter the recessed portion 11, thereby providing better heat-dissipating effect.

Although the invention has been explained in relation to its preferred embodiment, it is to be understood that many other possible modifications and variations can be made without departing from the scope of the invention as hereinafter claimed.

What is claimed is:

1. A bicycle saddle comprising:

a recessed portion in an upper side thereof;

means for introducing air into the recessed portion of the bicycle saddle, wherein the recessed portion of the bicycle saddle comprises a bottom with at least one opening; and at least one guide plate mounted in the bicycle saddle, said at least one guide plate including an inlet that faces a front of the bicycle saddle, said at least one guide plate and the bottom of the recessed portion of the bicycle saddle together defining a channel that communicates the inlet with said at least one opening of the recessed portion of the bicycle saddle.

2. The bicycle saddle as claimed in claim 1, wherein the air-introducing means includes a side vent defined in at least one of two lateral sides of the bicycle saddle.

3. The bicycle saddle as claimed in claim 2, wherein the air-introducing means including at least one side vent defined in each of the two lateral sides of the bicycle saddle.

4. A bicycle saddle comprising:

a recessed portion in an upper side thereof, with the recessed portion including a bottom having at least one opening;

means for introducing air into the recessed portion via said at least one opening; and at least one guide plate mounted in the bicycle saddle, said at least one guide plate including an inlet that faces a front of the bicycle saddle, said at least one guide plate and the bottom of the recessed portion of the bicycle saddle together defining a channel that communicates the inlet with said at least one opening of the recessed portion of the bicycle saddle.

5. Thy bicycle saddle as claimed in claim 4, further comprising a side vent defined in at least one of two lateral sides of the bicycle saddle.

6. The bicycle saddle as claimed in claim 4, further comprising at least one side vent defined in each of two lateral sides of the bicycle saddle.

* * * * *